United States Patent
Dickerson

(10) Patent No.: US 9,701,286 B2
(45) Date of Patent: Jul. 11, 2017

(54) SWING-DOWN JACK WITH PLURALITY OF DETENT LOCKS

(71) Applicant: LIPPERT COMPONENTS MANUFACTURING, INC., Elkhart, IN (US)

(72) Inventor: Tad A. Dickerson, South Bend, IN (US)

(73) Assignee: LIPPERT COMPONENTS MANUFACTURING, Elkhart, IN (US)

( * ) Notice: Subject to any disclaimer, the term of this patent is extended or adjusted under 35 U.S.C. 154(b) by 168 days.

(21) Appl. No.: 14/541,424

(22) Filed: Nov. 14, 2014

(65) Prior Publication Data

US 2015/0129821 A1    May 14, 2015

Related U.S. Application Data

(60) Provisional application No. 61/904,074, filed on Nov. 14, 2013.

(51) Int. Cl.
| | |
|---|---|
| *B60S 9/12* | (2006.01) |
| *B60S 9/08* | (2006.01) |
| *B60S 9/10* | (2006.01) |
| *E02F 9/08* | (2006.01) |

(52) U.S. Cl.
CPC . *B60S 9/08* (2013.01); *B60S 9/10* (2013.01); *E02F 9/085* (2013.01)

(58) Field of Classification Search
CPC .... E02F 9/085; B60S 9/02; B60S 8/10; B62D 37/00; F16B 7/1463; F16M 11/26
USPC ............... 254/93 VA; 280/764.1; 248/188
See application file for complete search history.

(56) References Cited

U.S. PATENT DOCUMENTS

| | | | | |
|---|---|---|---|---|
| 802,925 | A * | 10/1905 | Ferris | E02F 9/085 280/764.1 |
| 1,279,500 | A * | 9/1918 | Berry | B60S 9/12 254/423 |
| 2,526,905 | A * | 10/1950 | Sartin | B60S 9/04 248/168 |

(Continued)

FOREIGN PATENT DOCUMENTS

| | | |
|---|---|---|
| EP | 1842753 | 10/2007 |
| WO | WO 2005/051735 | 6/2005 |

OTHER PUBLICATIONS

International Search Report and Written Opinion issued in Int'l Pat. Appl. No. PCT/US2014/065726, dated Feb. 9, 2015.

*Primary Examiner* — Joseph J Hail
*Assistant Examiner* — Arman Milanian
(74) *Attorney, Agent, or Firm* — Barnes & Thornburg LLP

(57) ABSTRACT

The present invention provides a swing down jack for mounting to a vehicle to elevate the vehicle. The jack includes a mounting bracket and a leg. The leg includes an outer tube pivotally connected to the bracket along a first pivot axis, and an inner tube telescopically arranged within the outer tube. The jack further includes an actuator pivotally connected to the bracket along a second pivot axis laterally spaced from the first pivot axis so as to swing the outer tube between a generally horizontal and a generally vertical position and extend and retract the inner tube upon respective extension and retraction of the actuator. A detent lock is connected to the bracket and engageable with the outer tube so as to help fix the jack in the vertical position.

17 Claims, 13 Drawing Sheets

(56) References Cited

U.S. PATENT DOCUMENTS

| | | | | |
|---|---|---|---|---|
| 2,693,368 A | * | 11/1954 | Petron | B60D 1/155 280/482 |
| 2,926,889 A | * | 3/1960 | Obes | B60S 9/02 254/419 |
| 2,976,055 A | * | 3/1961 | Harrison | B60S 9/02 280/763.1 |
| 3,090,600 A | * | 5/1963 | Smith | B60P 7/15 248/200.1 |
| 3,281,160 A | * | 10/1966 | Vinther | B60S 9/02 248/351 |
| 3,384,937 A | * | 5/1968 | Muncke | A01B 59/004 172/439 |
| 3,396,854 A | * | 8/1968 | Crisp | B66C 23/80 280/764.1 |
| 3,425,714 A | * | 2/1969 | Morris | B60S 9/08 254/420 |
| 3,442,531 A | * | 5/1969 | Rutledge | B60S 9/08 280/765.1 |
| 3,489,428 A | * | 1/1970 | Hunter | B60S 1/0411 280/765.1 |
| 3,536,337 A | * | 10/1970 | Molnar | B60S 9/10 280/764.1 |
| 3,614,064 A | * | 10/1971 | Bennett | B60S 9/04 254/418 |
| 3,638,965 A | * | 2/1972 | Cassady | B62D 37/00 280/764.1 |
| 3,658,359 A | * | 4/1972 | Claflin | B60S 9/08 254/419 |
| 3,817,493 A | * | 6/1974 | Hanser | B60S 9/12 254/423 |
| 3,870,342 A | * | 3/1975 | Baxter | B62D 53/12 280/433 |
| 4,084,789 A | * | 4/1978 | Francis | B66F 1/06 254/418 |
| 4,577,819 A | * | 3/1986 | Bennett | F16M 11/04 248/123.11 |
| 4,619,369 A | * | 10/1986 | Mertens | B66C 23/80 212/304 |
| 4,623,125 A | * | 11/1986 | Ebey | B60D 1/66 254/418 |
| 4,635,904 A | * | 1/1987 | Whittingham | B60S 9/08 192/56.62 |
| 4,662,610 A | * | 5/1987 | Cofer | B60S 9/02 254/420 |
| 4,969,631 A | * | 11/1990 | Whittingham | B60S 9/08 254/425 |
| 5,137,301 A | * | 8/1992 | Muller | B60S 9/04 248/188.8 |
| 5,826,889 A | * | 10/1998 | Eden | B60S 9/06 180/41 |
| 6,425,604 B1 | * | 7/2002 | Schubert | B60S 9/08 254/425 |
| 6,854,756 B1 | * | 2/2005 | Solberg | B60D 1/04 280/482 |
| 7,967,261 B2 | * | 6/2011 | Wilcox | F16B 7/1463 248/188.5 |
| 8,714,528 B1 | * | 5/2014 | Young | B60S 9/04 254/419 |
| 8,783,716 B1 | * | 7/2014 | Pequignot | 280/763.1 |
| 9,333,823 B2 | * | 5/2016 | Shahroodi | B60D 1/665 |
| 2009/0250297 A1 | * | 10/2009 | Brun | B60S 9/08 187/291 |
| 2011/0156379 A1 | | 6/2011 | Henson et al. | |
| 2011/0215286 A1 | | 9/2011 | Harper | |
| 2013/0092890 A1 | * | 4/2013 | Alanko | B60S 9/08 254/420 |

\* cited by examiner

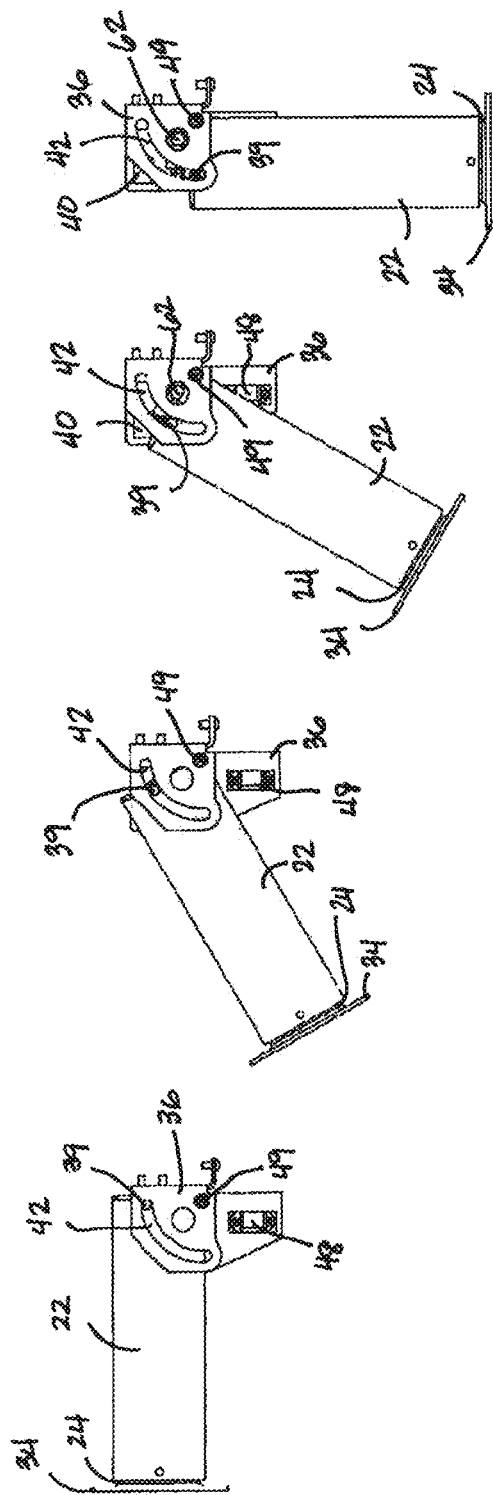

SWING-DOWN JACK WITH PLURALITY OF DETENT LOCKS

CROSS-REFERENCE TO RELATED APPLICATIONS

This application claims benefit of U.S. Provisional Patent Application No. 61/904,074, filed Nov. 14, 2013, the contents of which is incorporated herein by reference in its entirety.

FIELD OF THE INVENTION

This invention relates to jacks for vehicles, and particularly, a hydraulic jack assembly for use with a recreational vehicle.

BACKGROUND OF THE DISCLOSURE

Vehicles, such as a recreational vehicle or semi-trailer, incorporate jacks to support, level, or raise the vehicle. These jacks are used as leveling legs, stabilizing legs or landing gear, and include at least one extendible member that is telescopically driven to engage the ground. The extendible member telescopes from a static member fixed to the vehicle, such as by welding, bolting, and the like, at a predetermined height above the ground.

In order to account for variations in the dimensions of different vehicles and to protect both the vehicle and the jack from damage during transportation, the jack can be designed to pivot into a retracted or stowed configuration. However, while the ability to stow the jack can provide a benefit during transportation, the ability of it to swing makes it necessary to secure the jack in the deployed position. This has previously typically been done by a second hydraulic cylinder or other means, for a hydraulically powered jack. Even then, however, a force tending to move the vehicle fore or aft when it is supported by the jacks can cause the jacks to pivot and the vehicle to consequently "fall off" the jacks, with the jacks pivoting either forward or backward and the RV falling onto its suspension.

Accordingly, a need exists for a swing-down adjustable height jack for a vehicle that has an increased stability in the deployed position.

SUMMARY OF THE DISCLOSURE

The present invention provides a swing down jack for mounting to a vehicle to elevate the vehicle. The jack includes a mounting bracket and a leg. The leg includes an outer tube pivotally connected to the bracket along a first pivot axis, and an inner tube telescopically arranged within the outer tube. The jack further includes an actuator pivotally connected to the bracket along a second pivot axis laterally spaced from the first pivot axis so as to swing the outer tube between a generally horizontal and a generally vertical position and extend and retract the inner tube upon respective extension and retraction of the actuator. A detent lock is connected to the bracket and engageable with the outer tube so as to help fix the jack in the vertical, deployed position.

A general objective of the present disclosure is to provide a stowable jack assembly that is stabilized in the deployed position. This objective is accomplished by providing a swing-down jack with a locking mechanism that engages in the deployed position to help retain the jack in that position, and resist fore or aft forces that tend to push the vehicle off of the jacks. The jack can pivot between a horizontal, stowed position and a vertical deployed position, and the lock engages when the leg is extended in the deployed position and disengages when the jack is retracted in the deployed position.

BRIEF DESCRIPTION OF THE DRAWINGS

FIGS. 16A-16D are a series of side elevational views showing the transition of the jack of FIG. 1 from a stowed position to a deployed position as in FIG. 5.

DETAILED DESCRIPTION OF THE PREFERRED EMBODIMENT

Figure 1:
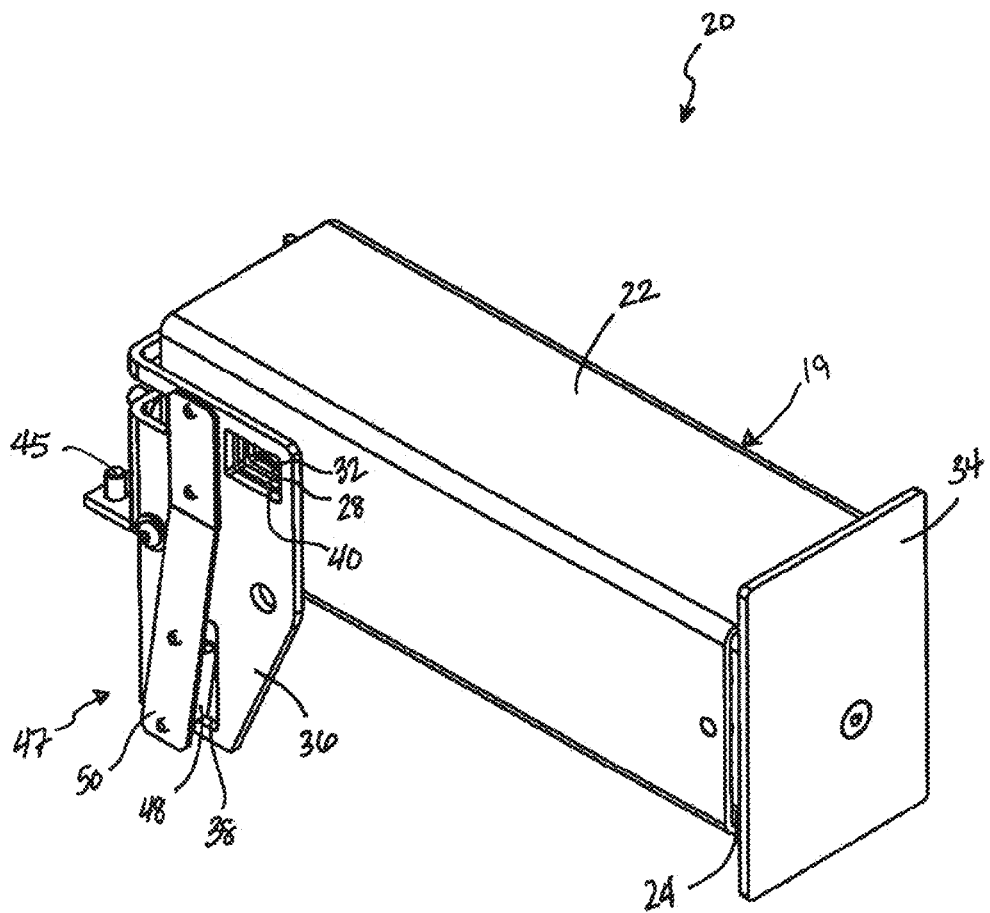
FIG. 1 is a front, top, left side perspective view of an illustrative jack assembly depicted in a stowed, generally horizontal, position.
Figure 2:
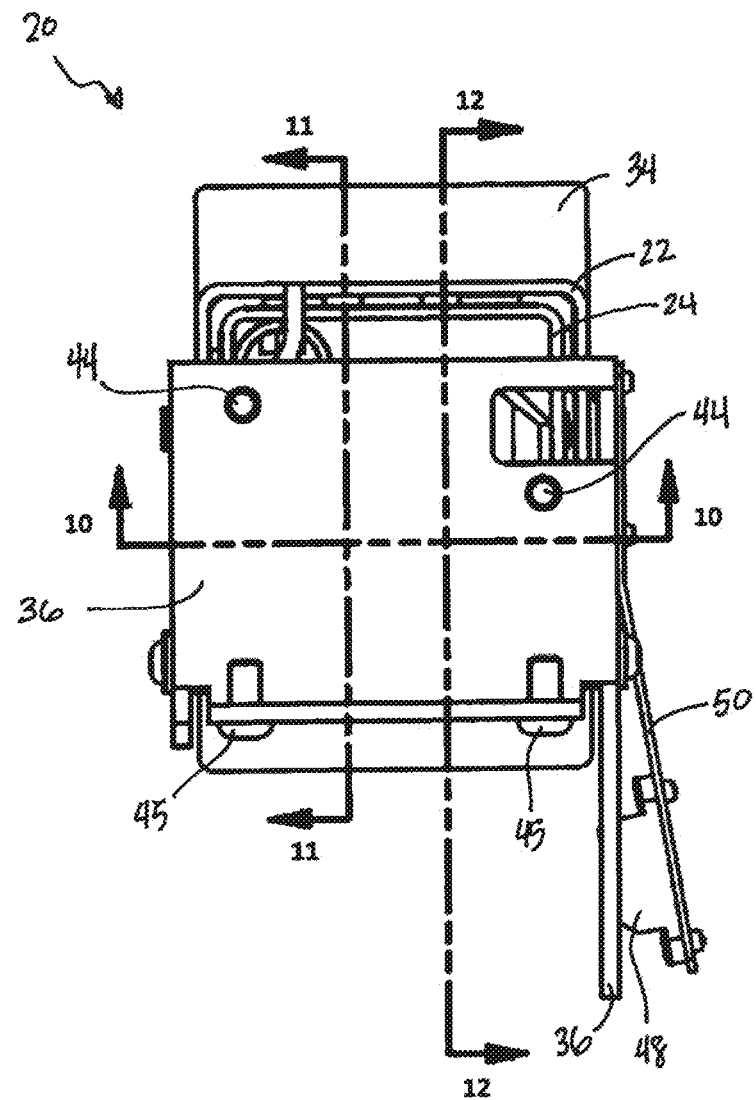
FIG. 2 is a front elevational view of the jack of FIG. 1 in a stowed position.
Figure 3:
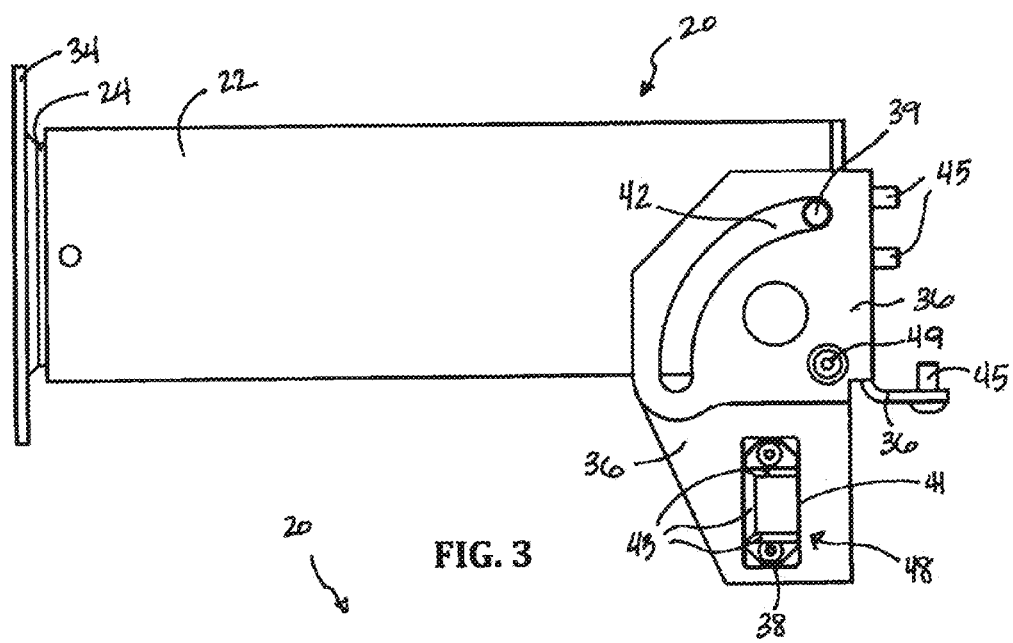
FIG. 3 is a right side elevational view of a of the jack of FIG. 1 in a stowed position.
Figure 4:
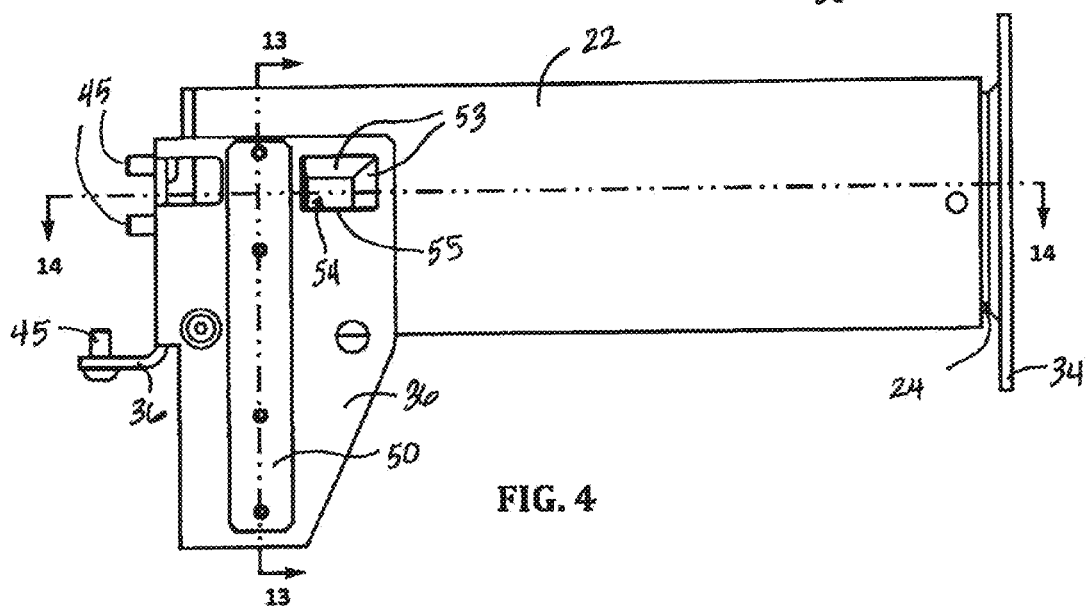
FIG. 4 is a left side elevational view the jack of FIG. 1 in the stowed position.
Figure 5:
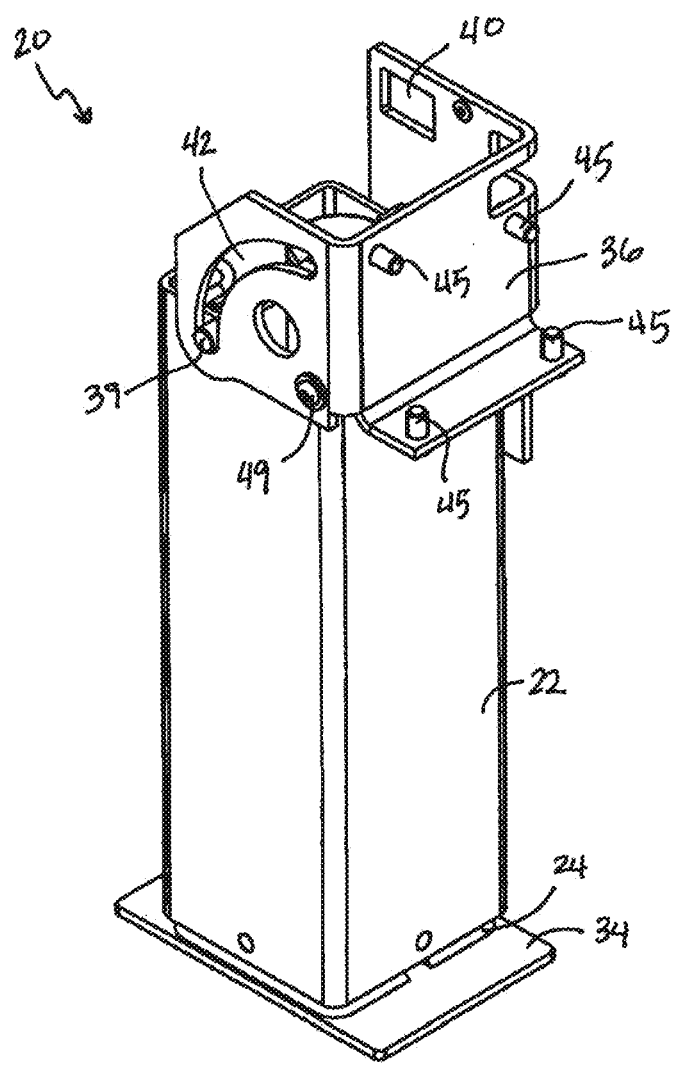
FIG. 5 is a front, top, right side perspective view of the jack of FIG. 1 in a deployed, generally vertical, position.

Referring to FIGS. 1-16, a vehicle, such as a recreational vehicle, trailer, or the like, has one or more extendible jack assemblies 20. FIGS. 1-4 depict a non-limiting example of the leg assembly 20 in a generally horizontal, stowed position, while FIGS. 5-8 depict the jack 20 in a generally vertical, deployed position. Each assembly 20 has a leg 19 with an outer member 22 having open first and second ends 25, 27. The outer member first end 25 includes a pivot arm 26 that is pivotally connected to a mounting bracket 36 which can be fixed to the vehicle. The leg 19 further includes a telescoping inner member 24 with a first open end 23 and a second end 21 coupled to a foot 34.

The inner member 24 has a tube shape corresponding to but slightly smaller than the outer member 22 with the first end 23 disposed inside the outer member 22 and the second end 21 extending out of the outer member second end 27. The outer dimensions of the inner member 24 are proportioned so as to form a sliding fit within the inside dimensions of the outer member 22. Bearing pads 31 (FIG. 9) made of a lubricious plastic material are provided between the two telescoping tubes 22, 24 to facilitate the sliding. In the embodiment illustrated, both members 22, 24 are tubes of a rectangular cross section, formed from steel or other suitable material having similar strength characteristics. Moreover, although a rectangular tube is described herein, any shaped tube, such as a round tube, may be used without departing from the scope of the present invention.

Figures 6, 7:
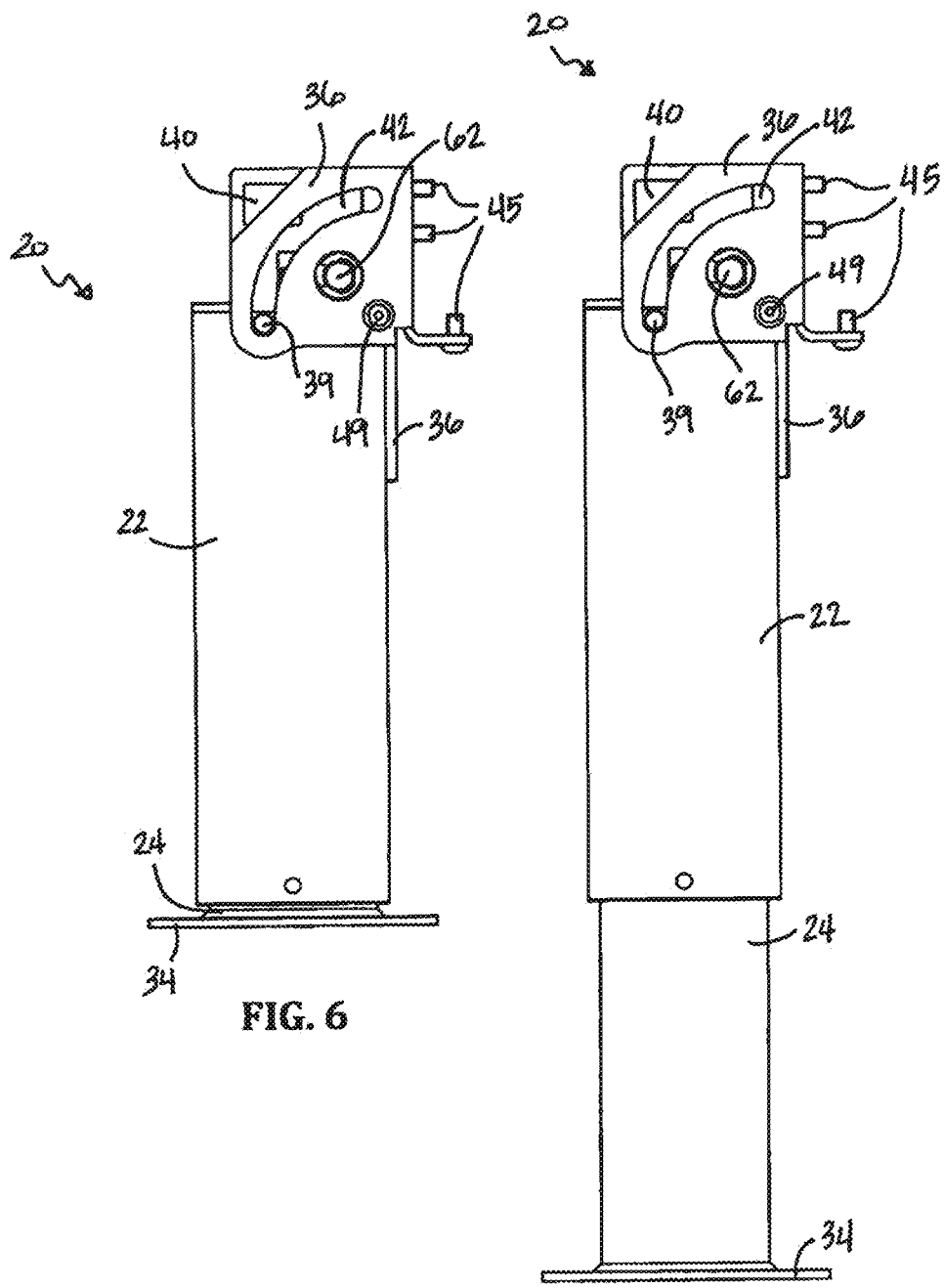
FIG. 6 is a right side elevational view of the jack of FIG. 5 showing the inner member fully retracted.
FIG. 7 is a right side elevational view of the jack of FIG. 5 showing the inner member in an extended state.

Referring to FIGS. 6-7, the inner member 24 is telescopically driven toward the extended position by an actuator 60 that urges the inner member 24 telescopically out of the outer member second end 27, helps retract it and helps swing the leg between the stowed and deployed positions. In one example, the inner and outer members 22, 24 define an expandable cavity 70 (see FIG. 10-15). FIGS. 8 and 10-15 show a hydraulic actuator 60 disposed in the cavity 70. The actuator 60 includes a piston 58 housed in a cylinder 56, where one end 68 of the actuator 60 is fixed relative to the bracket 36 and an opposing end 59 is in communication with the inner member 24. Actuation of the hydraulic actuator 60 urges the inner member 24 telescopically out of the outer member 24 thereby moving the jack between a retracted position, as shown in FIG. 6, to an extended position, as shown in FIG. 7.

Figure 12:
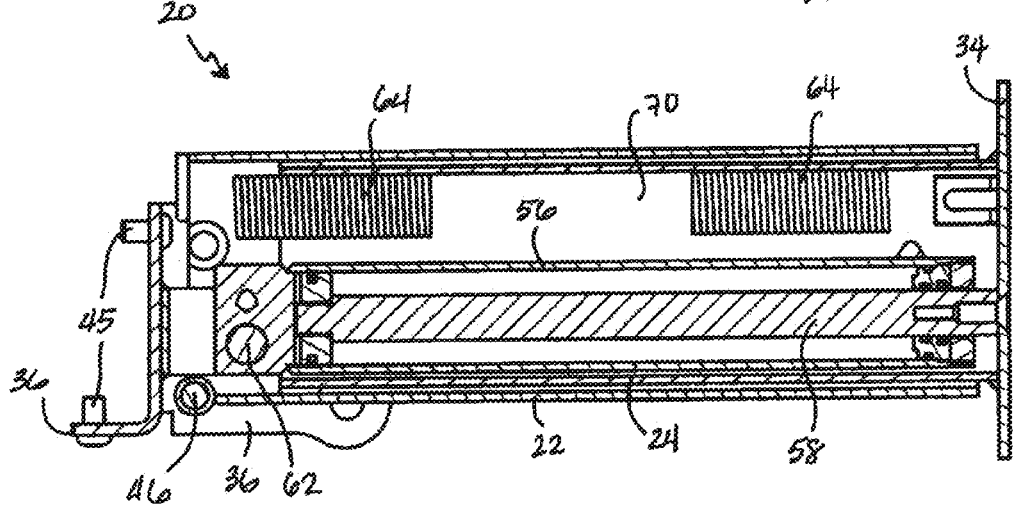
FIG. 12 is a sectional view of the jack of FIG. 1 taken along the line 12-12 of FIG. 2.
Figure 13:
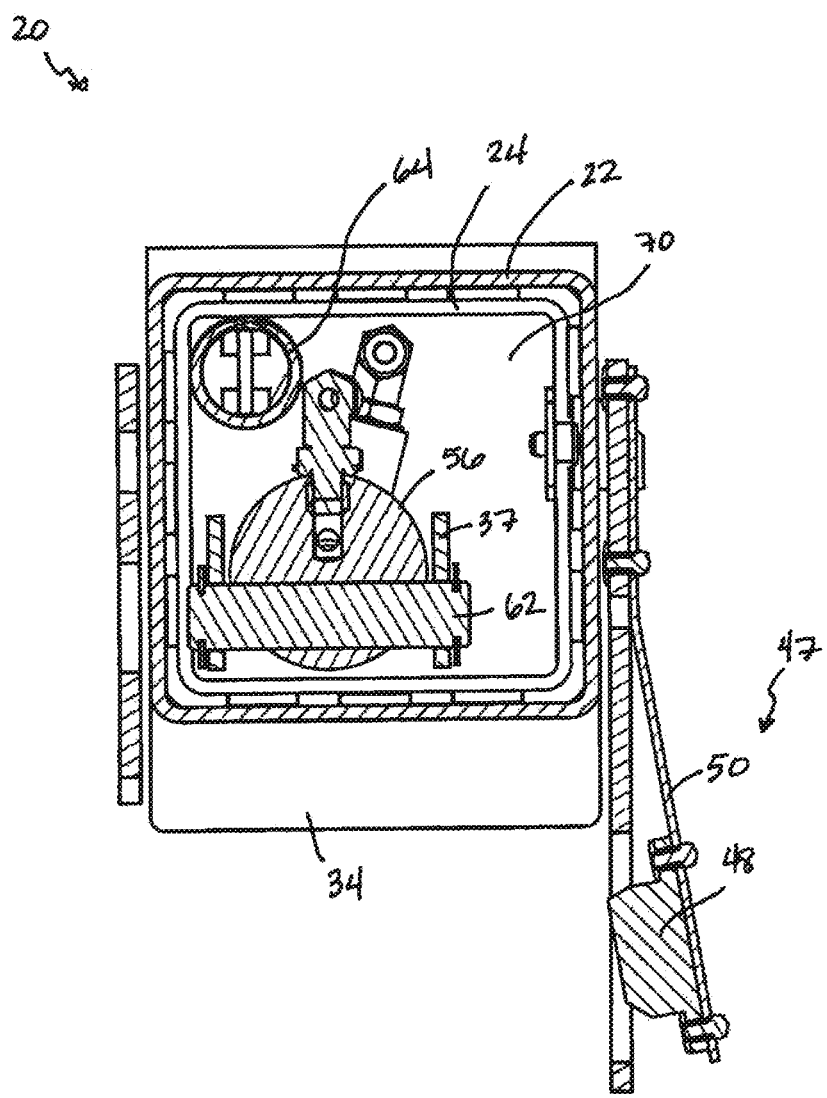
FIG. 13 is a sectional view of the jack of FIG. 1 taken along the line 13-13 of FIG. 4.
Figure 14:
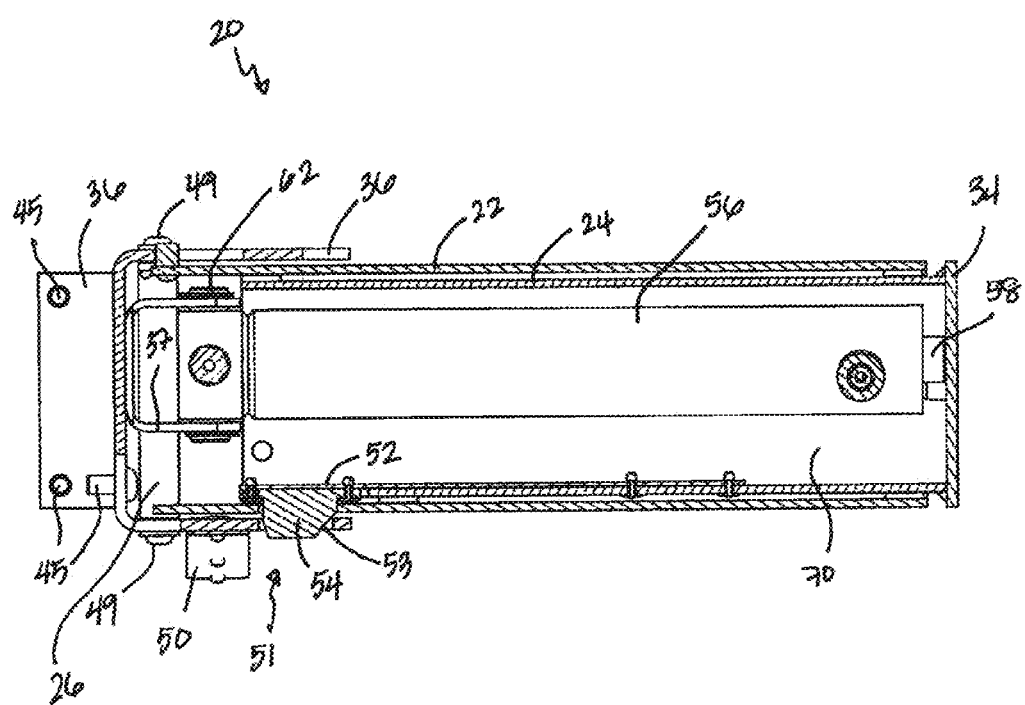
FIG. 14 is a sectional view of the jack of FIG. 1 taken along the line 14-14 of FIG. 4.
Figure 15:
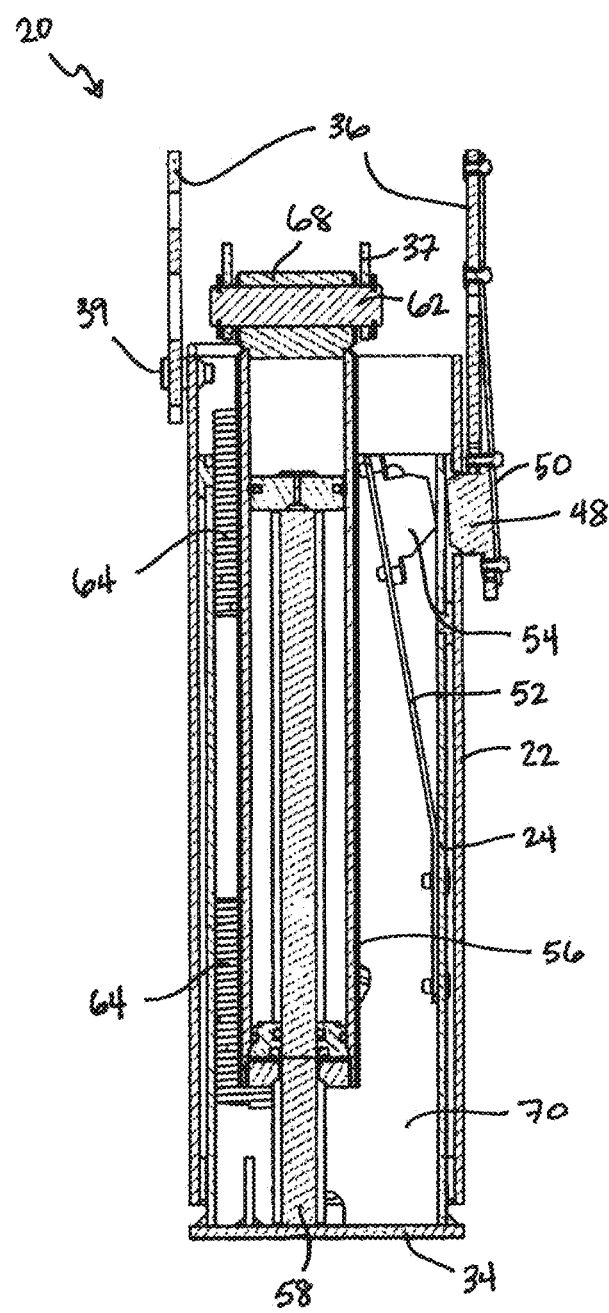
FIG. 15 is a sectional view of the jack of FIG. 5 taken along the line 15-15 of FIG. 8.

In order to retract the inner member 24, one or more biasing devices such as return spring 64 (shown broken in FIG. 9) is positioned in the cavity 70 (see FIG. 12). The return spring 64 urges the inner member 24 telescopically into the outer member 22 toward the retracted position. The return spring 64 has its upper end hooked over the top of the outer tube 22 and its lower end fixed to the inner member 24 to urge the inner member 24 back into the outer member 22 to the retracted position. The resistance provided by the spring 64 assures that the pivoting down action will occur prior to member 24 extending, and upon retraction, that the member 24 retracts prior to pivoting up.

Although an extension spring is shown, other mechanisms for biasing the inner member toward the retracted position can be provided, such as an external spring or the like, without departing from the scope of the invention. Moreover, although ends of the springs 64 are described to be fixed to the leg assembly in one configuration, if one or more springs are provided, the ends of the springs can be fixed to any object that allows the spring(s) to urge the inner member toward the retracted position. For example, one end of a spring can be fixed to the vehicle and an opposing end can be fixed to the inner member.

The hydraulic actuator 60 is a self-contained expandable reservoir that is in fluid communication, such as by a hose, with a source of pressurized hydraulic fluid to actuate the actuator 60. As a result, a sealing member interposed between the inner and outer members is not required. Although a hydraulic actuator 60 is disclosed, other types of actuator such as a screw jack, rack and pinion, pneumatic actuator, and the like can be used without departing from the scope of the invention.

In the example shown in FIGS. 1-16, the first end 68 of the actuator 60 is pivotally coupled to the bracket 36 with a pivot pin 62. Pivot pin 62 is disposed in a passage 69 in the first end 68 of the actuator 60 and couples to a yoke-like projection 37 of the bracket 36 to establish a pivot connection between the actuator 60 and the bracket 36. In the present example, the pivot axis (axis of pin 62) of the actuator 60 is different and laterally spaced from the pivot axis (axis of pin 46) of the outer member 22 which permits the actuator 60 to pivot the leg 19 back up into the stowed position from the deployed position when the actuator is retracted.

The bracket 36 is fixed with a pivot pin 46 and fasteners 49 to hinge barrel 26 which is welded or otherwise affixed to the outer member 22. The bracket 36 includes a guide slot 42 having an arcuate channel. A projection 39 extending from an outer surface of the outer member 22 is positioned in the guide slot 42. When the outer member 22 is rotated on the pivot axis defined by the pin 46, the projection 39 travels within the guide slot 42. The ends of the slot 42 in the bracket 36 establish upper and lower stops that prevent the projection 39 and therefore the outer member 22 from pivoting through an angle greater than about 90° (or other predetermined angle) where a first boundary is defined by the generally horizontal, stowed position and a second boundary is defined by the generally vertical, deployed position. FIGS. 16A-D depict the transition of the leg 20 between the stowed (FIG. 16A) and deployed (FIG. 16D) positions.

Figure 9:
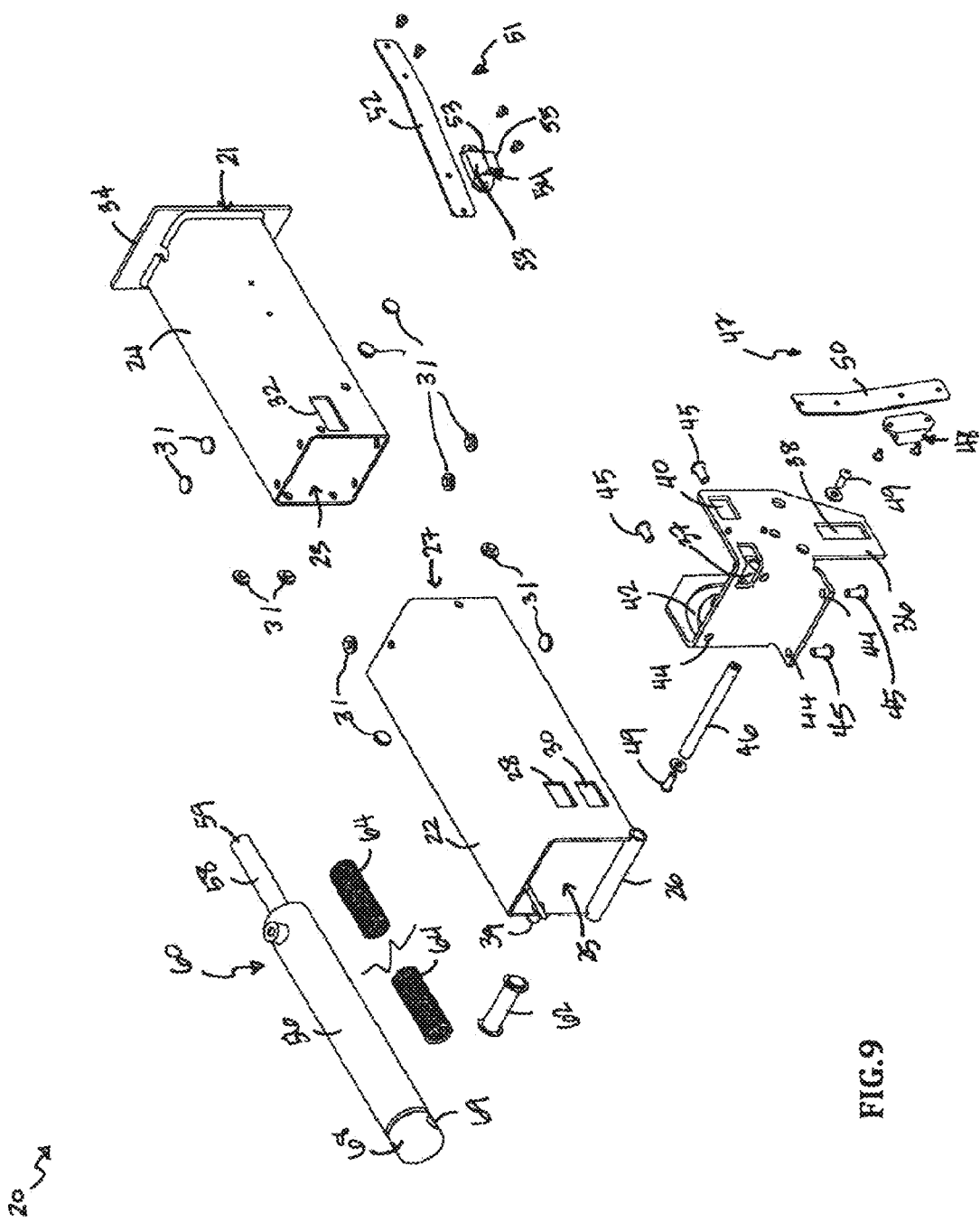
FIG. 9 is an exploded view showing the components of the jack of FIG. 1.
Figure 10:
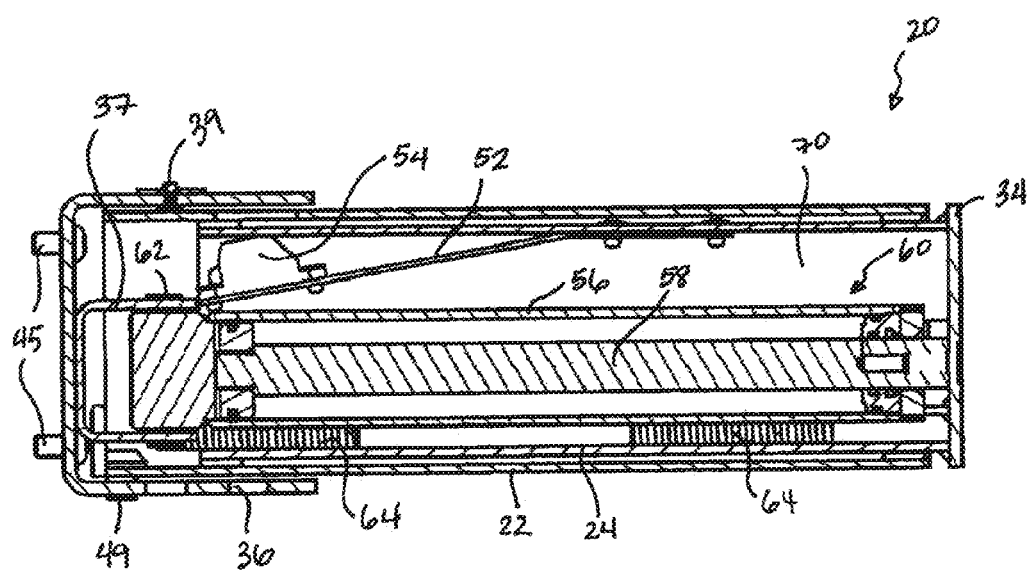
FIG. 10 is a sectional view of the jack of FIG. 1 taken along the line 10-10 of FIG. 2.
Figure 11:
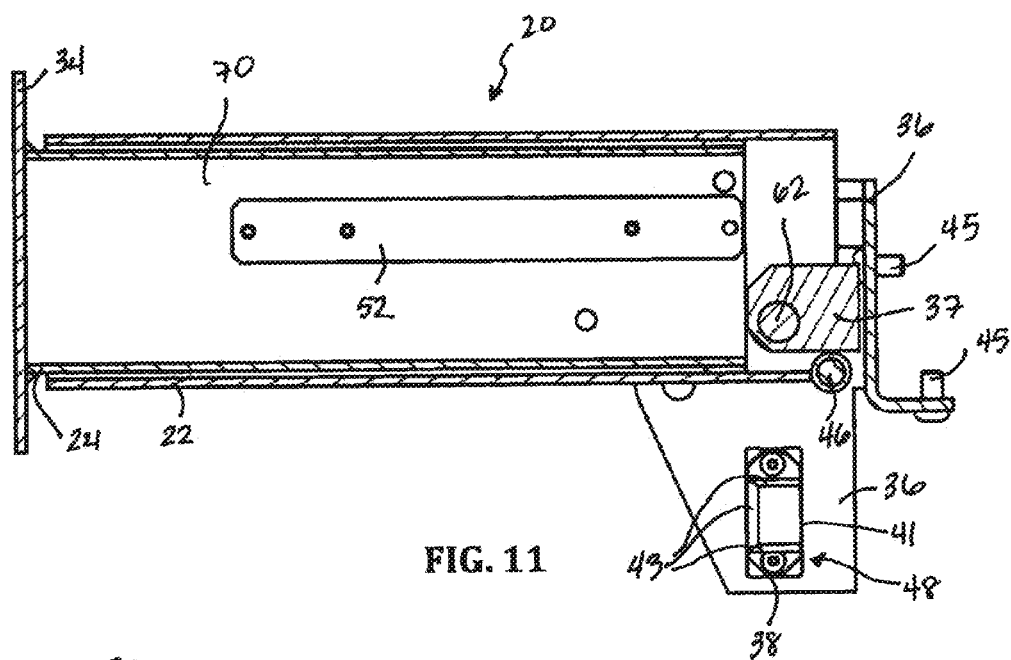
FIG. 11 is a sectional view of the jack of FIG. 1 taken along the line 11-11 of FIG. 2.

The bracket 36 further includes a plurality of holes 44 formed therethrough. The bracket 36 shown in FIG. 9 is configured to accommodate the rectangular cross section of the outer member 22. However, the bracket 36 can have any shape without departing from the scope of the invention. Although a pin 46 and fasteners 49 are shown to couple the bracket 36 to the outer member 22, other methods for fixing the bracket 36 relative to the outer member 22, such as clamps, bolts, and the like, could be used without departing from the scope of the invention.

The bracket 36 is bolted to a vehicle with fasteners 45, and includes a plurality of holes 44 formed therethrough. Additional holes 44 can be provided for bolting the bracket 36 to a vehicle using bolts 45. Advantageously, the bracket 36 can be welded to the vehicle if the ability to detach the bracket 36 from the vehicle is not desired.

A foot 34 mounted to the inner member second or lower end 21 engages the ground, or other supporting surface, to support the vehicle when the jack is extended in the deployed position. The foot 34 provides a large surface area (e.g., 20 square inches or more) for engagement with the ground to prevent the jack assembly 20 from sinking or forming a depression in the ground. A large foot also helps the jack stay vertical (assuming the ground is horizontal), although if too large the foot can hamper the leg from swinging between the stowed and deployed positions. In an embodiment, the foot 34 is fixed, such as by welding to the second end 21 of the inner member 24. In other embodiments, the foot 34 can be coupled to the leg assembly in any suitable fashion. For example, the foot 34 can be pivotally mounted to the inner member 24. By pivotally mounting the foot 34 to the inner member 16, the foot 34 pivots to accommodate an uneven ground or other non-level supporting surface.

The jack assembly 20 includes two detent locks 47, 51. An inner detent lock 51 for stabilizing the leg 20 in a generally horizontal, stowed position (see FIGS. 1-4) includes a lock spring 52 coupled to a lock block 54. The lock spring 52 is disposed within the cavity 70 and is mounted to an inner surface of the inner member 24 such that the lock spring 52 biases the lock block 54 towards the exterior of the leg 20. Openings 32, 28 and 40 are positioned in the inner member 24, outer member 22 and bracket 36, respectively. The openings 28, 32 and 40 are dimensioned to permit the lock block 54 to pass therethrough. When the jack 20 is in the generally horizontal, stowed configuration with the inner member 24 fully retracted within outer member 22, openings 28, 32 and 40 are aligned and lock spring 52 compels lock block 54 to pass therethrough so that the bracket 36, outer member 22 and inner member 24 are locked together against pivotal or translational relative movement to any significant extent.

The lock block 54 includes at least one lock face 55, which presents itself in a plane generally parallel to the pivot axis of the leg (which in the embodiment illustrated is also generally parallel to the axial direction of the leg, which is the direction the inner and outer members slide relative to one another to extend or retract) to stabilize the leg 20 in the stowed position. In addition, the lock block 54 has as at least one cam face 53 (two such faces on the lower and rear sides in the embodiment illustrated) at an oblique angle to the axial direction of the leg to allow the leg 20 to transition between the stowed and deployed positions. When the leg is rotated downwardly under the force of the actuator 60, the lower and rear (in the deployed position) edges of the openings 28 and 40 in the outer member and bracket cam on faces 53 and the angled corner between them to cause the lock block 54 to retract from the opening 40 and, if some extension has begun to occur, also from the opening 28. The top surface of block 54 may also be somewhat oblique, but the front surface (top and front refer to the block surfaces when in the deployed position) should be in a plane that is generally parallel to the pivot axis of the leg (axis of pin 46) to help hold the leg 19 against pivoting from the stowed position to the deployed position. Even as such, with enough force, the cantilever spring 52 will twist and permit the block 54 to cam on and be retracted from the openings.

Referring to FIG. 7, leg 19 is shown in the deployed, extended configuration with inner member 24 extended relative to the outer member 22. The lock block 54 is positioned in opening 32 with an outer face resting against an interior surface of the outer member 22. When inner member 24 is retracted into the outer member 22, opening 32 in the wall of inner member 24 and opening 28 in the wall of outer member 22 are made to align. As openings 28 and 32 come into alignment, lock block 54 is compelled to pass through the opening 28 under the bias of lock spring 52.

Figure 8:
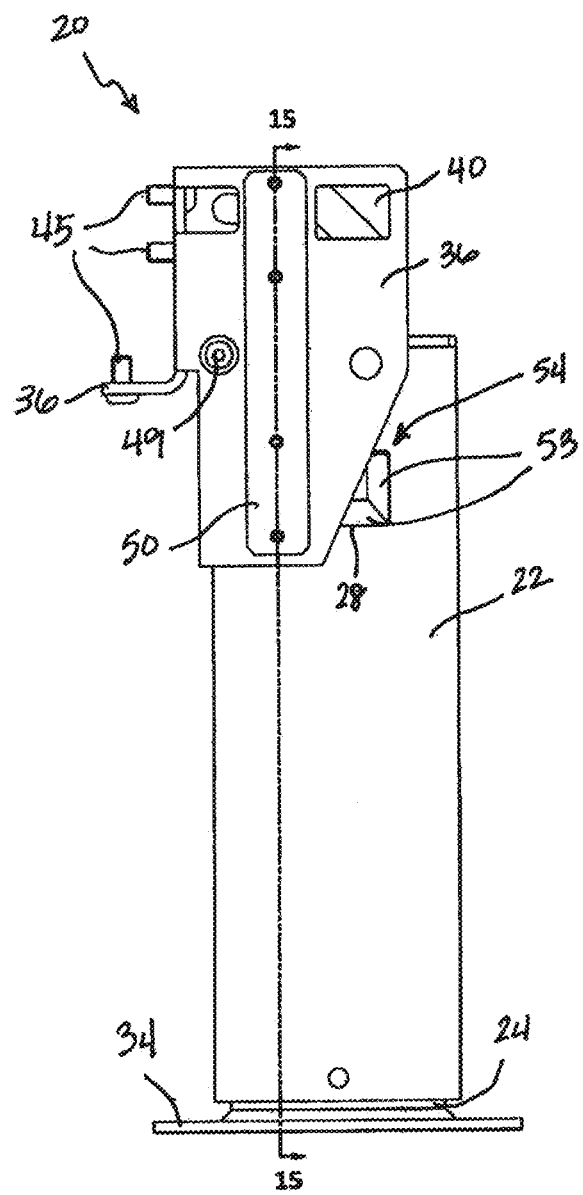
FIG. 8 is a left side elevational view of the jack of FIG. 5 showing the inner member fully retracted.

Referring to FIGS. 6 and 8, leg 20 is shown in the deployed, fully or almost fully retracted configuration. In this configuration, aligned openings 28 and 32 are partially obstructed by a portion of bracket 36. The outer face of lock block 54 can therefore pass through openings 28 and 32 to rest on an inner surface of bracket 36. As inner member 22 is pivoted upward relative to the bracket 36 from the generally vertical, deployed position to the generally horizontal, stowed position, opening 40 in bracket 36 comes into alignment with aligned openings 28 and 32. As openings 28 and 32 come into alignment with opening 40, lock block 54 is compelled to pass through the opening 40 under the bias of lock spring 52. This happens rapidly since the front surface of the block 54 is a right angle surface, when that surface clears the lower edge of the opening 40.

The ability to reverse the above described transition from the deployed, extended configuration to the stowed, retracted configuration is facilitated by the lock faces 55 and cam faces 53 of the lock block 54. Lock face 55 of the lock block 54 rests against a bottom edge of the openings 28, 32 and 40 (in the stowed position) to stabilize the leg 20 in the stowed position and oppose the leg 19 from pivoting downward into the deployed position. However, it is desirable to be able to pivot the leg 20 from the stowed to the deployed position. Therefore, when a threshold force is applied to pivot the outer member 22 downward, cam faces 53 guide the lock block 54 out of the opening 40 in bracket 36 to enable the transition. Similarly, when the inner member 24 is extended by actuator 60, cam faces 53 guide the lock block 54 out of the opening 28 in the outer member 22.

In addition to the inner lock 51, which has been provided in prior jacks, an outer lock detent lock 47 is included for stabilizing the leg 20 in a generally vertical, deployed position (see FIGS. 5-8) according to the invention. The outer lock 47 includes a lock spring 50 coupled to a lock block 48. The lock spring 50 is mounted on an external surface of the bracket 36 such that the lock spring 50 biases the lock block 48 toward the interior of the bracket 36 and when in the deployed position, the interior of the outer member 22 as well. Openings 30 and 38 are positioned in the outer member 22 and bracket 36, respectively. The openings 30 and 38 are dimensioned to permit the lock block 48 to pass therethrough. When the jack 20 is in the generally vertical, deployed configuration, the outer member 22 is positioned relative to bracket 36 such that openings 30 and 38 are aligned and lock spring 50 compels lock block 48 to pass therethrough.

The lock block 48 includes at least one lock face 41 (FIG. 3) on its front side to stabilize the leg 20 in the deployed position as well as at least one cam face 43 (the top, rear and bottom sides in the embodiment illustrated) to allow the leg 20 to be moved between the stowed and deployed positions. The lock face is on the front of the block to provide increased resistance to the leg 19 pivoting rearwardly, like if the RV was bumped from the rear. The surface 43 on the rear of the block 48 is the most angled so as to cam on the front edge of outer member 22 when the leg 19 is swung down. When the leg 20 is stowed as in FIGS. 1-4 and the inner member 24 is retracted relative to outer member 22, the lock block 48 is positioned in opening 38 with a portion of lock block 48 extending through the opening 38 into a space beneath the outer member 22. When leg 19 is pivoted into the deployed configuration, opening 30 in the wall of outer member 22 and opening 38 in the wall of bracket 36 are made to align. As openings 30 and 38 come into alignment, lock block 48 is compelled to pass through the opening 30 as a result of bias applied by cantilever lock spring 50. This transition is facilitated by the lock faces 41 and cam faces 43 of the lock block 48. In particular, cam faces 43 and the inner end of block 48 slide over the outer surface of the outer member 22 until the openings 30 and 38 come into alignment. There may or may not be an opening in the inner member 24 in alignment with the openings 30 and 38 when the leg 19 is fully retracted. When the member 24 is extended more than a small amount, the member 24 will be below the level of the block 48 and openings 30, 38. In the embodiment illustrated, there is no such aligned hole in the inner member 24, so that advantageously when the inner member 24 is fully retracted, it cams on the lower surface of the block 48 to move the block partially out of the openings 30, 38 and facilitate further disengagement of the block 48 from the opening 30 in the outer member so the leg 19 can be swung up.

Referring to FIGS. 6 and 8, leg 20 is shown in the deployed, retracted configuration. In this configuration, aligned openings 30 and 38 are obstructed by an outer surface of the inner member 24. The outer face of lock block 48 therefore rests on the outer surface of the inner member 24. As inner member 24 is extended relative to the outer member 22, the outer surface of the inner member 24 moves past aligned openings 30 and 38 allowing the lock block 48 to further extend through the openings 30, 38 as a result of the bias applied by lock spring 52.

Pivoting from the deployed position to the stowed position is opposed by the lock faces 41 of the lock block 48. The lock face 41 of the lock block 48 rests against a side edge of the openings 30 and 38 to stabilize the leg 20 in the deployed position and oppose the outer member 22 from pivoting upwards into the stowed position. However, it is desirable to be able to transition the leg 20 from the deployed extended position, to the stowed position. Therefore, when the inner member 24 is retracted by actuator 60, cam faces 43 of the lock block 48 slide across the outer surface of the inner member 24. Similarly, when a threshold force is applied to pivot the outer member 22 upwards, cam faces 43 of the lock block 48 cam out of the opening 30 in outer member 22 to enable the transition.

It will be obvious to those skilled in the art that various changes and modifications can be made to the disclosed embodiments without departing from the scope of the invention.

What is claimed is:

1. A swing down jack for mounting to a vehicle to elevate the vehicle, comprising:
    a mounting bracket;
    a leg including:
        an outer tube pivotally connected to the bracket along a first pivot axis; and
        an inner tube telescopically arranged within the outer tube;
    an actuator pivotally connected to the bracket along a second pivot axis laterally spaced from the first pivot axis so as to swing the outer tube between a generally horizontal and a generally vertical position and extend and retract the inner tube upon respective extension and retraction of the actuator; and
    a detent lock connected to the bracket and engageable with the outer tube so as to help fix the jack in the vertical position when the inner tube is extended, wherein retraction of the inner tube from an extended position initiates disengagement of the detent lock from the outer tube.

2. The swing down jack of claim 1, wherein the detent lock only fully engages the outer tube when the outer tube is in the vertical position and the inner tube is at least partially extended from a retracted position.

3. The swing down jack of claim 1, wherein the detent lock comprises a lock block.

4. The swing down jack of claim 3, wherein the lock block has at least one locking surface and at least one cam surface.

5. The swing down jack of claim 3, wherein a bottom surface of the lock block is a cam surface.

6. The swing down jack of claim 3, wherein a side surface of the lock block is a locking surface.

7. The swing down jack of claim 3, wherein the initial disengagement of the detent lock from the outer tube enables pivoting of the leg with respect to the mounting bracket in response to a threshold force applied to the outer tube.

8. The swing down jack of claim 7, wherein pivoting of the leg causes further disengagement of the detent lock from the outer tube.

9. The swing down jack of claim 7, wherein the detent lock comprises a lock block having at least one cam face, wherein pivoting of the leg causes the at least one cam face to cam out of locking engagement with the outer tube.

10. The swing down jack of claim 1 further comprising a second detent lock connected to the bracket and engageable with the outer tube so as to help fix the jack in the horizontal position when the inner leg is retracted.

11. The swing down jack of claim 10 wherein extension of the inner tube from a retracted position initiates disengagement of the second detent lock from the outer tube.

12. The swing down jack of claim 11 wherein the second detent lock only fully engages the outer tube when the outer tube is in the horizontal position and the inner tube is fully retracted.

13. The swing down jack of claim 1, wherein the second detent lock comprises a second lock block.

14. The swing down jack of claim 13, wherein the second lock block has at least one locking surface and at least one cam surface.

15. The swing down jack of claim 11, wherein the initial disengagement of the second detent lock from the outer tube enables pivoting of the leg with respect to the mounting bracket in response to a threshold force applied to the outer tube.

16. The swing down jack of claim 15, wherein pivoting of the leg causes further disengagement of the second detent lock from the outer tube.

17. The swing down jack of claim 16, wherein the second detent lock comprises a second lock block having at least one cam face wherein pivoting of the leg causes the at least one cam face of the second lock block to cam out of locking engagement with the outer tube.

* * * * *